(12) United States Patent
Magill et al.

(10) Patent No.: US 11,138,114 B2
(45) Date of Patent: Oct. 5, 2021

(54) PROVIDING DYNAMIC SELECTION OF CACHE COHERENCE PROTOCOLS IN PROCESSOR-BASED DEVICES

(71) Applicant: Microsoft Technology Licensing, LLC, Redmond, WA (US)

(72) Inventors: Kevin Neal Magill, Durham, NC (US); Eric Francis Robinson, Raleigh, NC (US); Derek Bachand, Raleigh, NC (US); Jason Panavich, Raleigh, NC (US); Michael P. Wilson, Fuquay-Varina, NC (US); Michael B. Mitchell, Fuquay-Varina, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/736,865

(22) Filed: Jan. 8, 2020

(65) Prior Publication Data
US 2021/0209026 A1    Jul. 8, 2021

(51) Int. Cl.
*G06F 13/28* (2006.01)
*G06F 12/0831* (2016.01)
*G06F 12/0891* (2016.01)
*G06F 3/06* (2006.01)
*G06F 9/30* (2018.01)

(52) U.S. Cl.
CPC ........ *G06F 12/0831* (2013.01); *G06F 3/0659* (2013.01); *G06F 3/0685* (2013.01); *G06F 9/30043* (2013.01); *G06F 12/0891* (2013.01); *G06F 3/0604* (2013.01)

(58) Field of Classification Search
CPC combination set(s) only.
See application file for complete search history.

(56) References Cited

U.S. PATENT DOCUMENTS 5,835,950 A  11/1998 Cho et al.
6,829,665 B2 12/2004 Jones et al.
(Continued)

FOREIGN PATENT DOCUMENTS

EP    0825538 A1    2/1998

OTHER PUBLICATIONS

Chapman, Matthew, "vNUMA: Virtual Shared-Memory Multiprocessors", In Thesis of the University of New South Wales, 2008, 209 Pages.
(Continued)

*Primary Examiner* — Yong J Choe
(74) *Attorney, Agent, or Firm* — Withrow & Terranova, PLLC

(57) ABSTRACT

Providing dynamic selection of cache coherence protocols in processor-based devices is disclosed. In this regard, a processor-based device includes a master PE and at least one snooper PE, as well as a central ordering point (COP). The COP dynamically selects, on a store-by-store basis, either a write invalidate protocol or a write update protocol as a cache coherence protocol to use for maintaining cache coherency for a memory store operation by the master PE. The selection is made by the COP based on one or more protocol preference indicators that may be generated and provided by one or more of the master PE, the at least one snooper PE, and the COP itself. After selecting the cache coherence protocol to use, the COP sends a response message to each of the master PE and the at least one snooper PE indicating the selected cache coherence protocol.

36 Claims, 10 Drawing Sheets

(56) References Cited

U.S. PATENT DOCUMENTS

| | | |
|---|---|---|
| 8,776,063 B2 | 7/2014 | Dice et al. |
| 2005/0120182 A1 | 6/2005 | Koster et al. |
| 2007/0101068 A1 | 5/2007 | Anand et al. |
| 2016/0378659 A1 | 12/2016 | Gschwind et al. |
| 2017/0177482 A1 | 6/2017 | Greenspan |
| 2018/0089084 A1 | 3/2018 | Le et al. |
| 2018/0165199 A1 | 6/2018 | Brandt et al. |
| 2019/0087333 A1 | 3/2019 | Robinson et al. |

OTHER PUBLICATIONS

Giorgi, et al., "PSCR: A Coherence Protocol for Eliminating Passive Sharing in Shared-Bus Shared-Memory Multiprocessors", In Journal of IEEE Transactions on Parallel and Distributed Systems, vol. 10, Issue 7, Jul. 1999, pp. 742-763.

Kayi, et al., "Adaptive Cache Coherence Mechanisms with Producer—Consumer Sharing Optimization for Chip Multiprocessors", In Journal of IEEE Transactions on Computers, vol. 64, Issue 2, Feb. 2015, pp. 316-328.

Ivosevic, et al., "Time Domain Performance Evaluation of Adaptive Hybrid Cache Coherence Protocols", In Proceedings of the 10th Mediterranean Electrotechnical Conference, vol. 1, May 29, 2000, pp. 41-44.

"International Search Report and Written Opinion Issued in PCT Application No. PCT/US20/061893", dated Mar. 15, 2021, 13 Pages. (MS# 407901-WO-PCT).

West, et al., "Core Monitors: Monitoring Performance in Multicore Processors", In Proceedings of the 6th ACM Conference on Computing Frontiers, May 18, 2009, pp. 31-39.

Quayle Action for U.S. Appl. No. 17/012,211, dated Aug. 13, 2021, 7 pages.

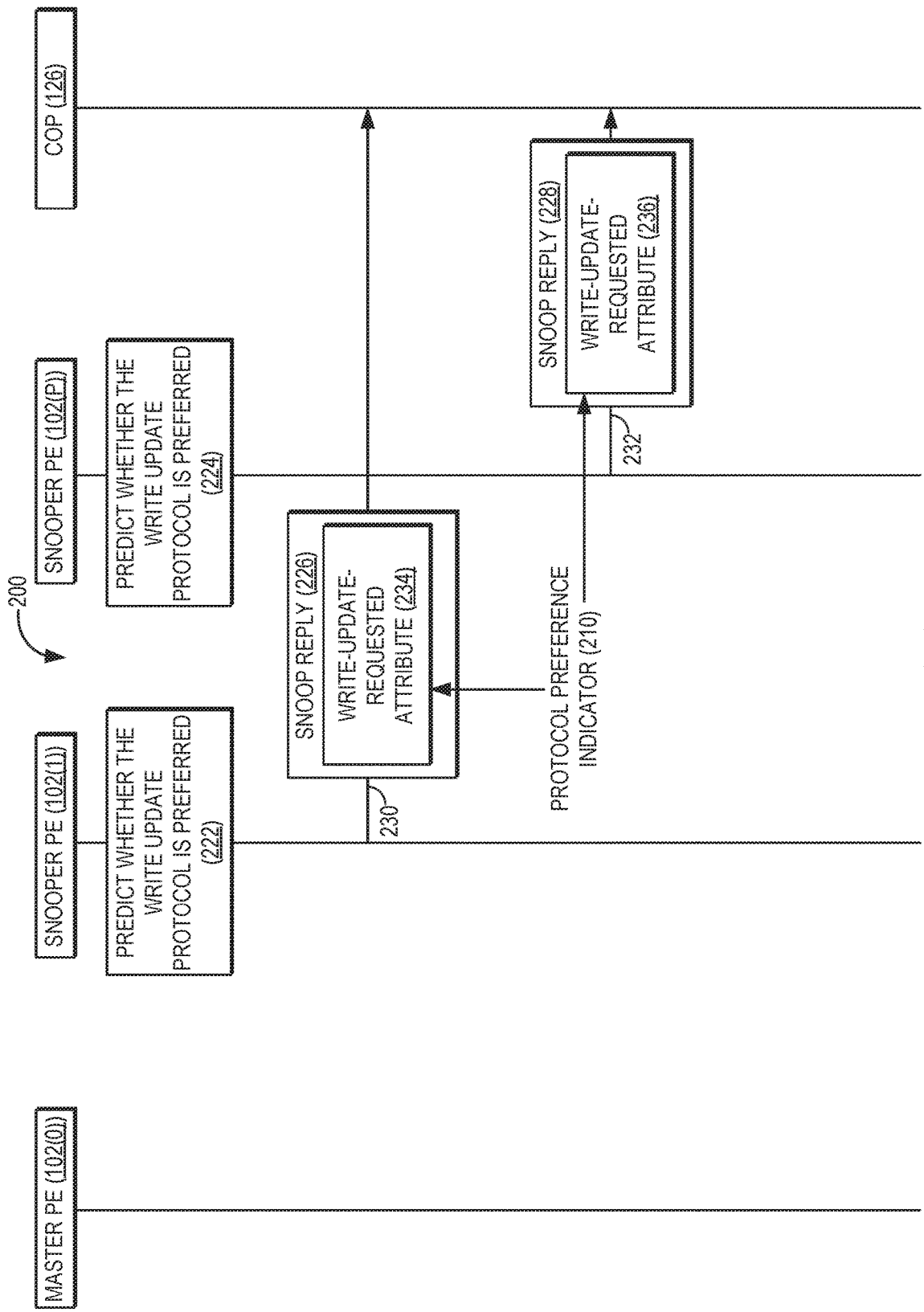

PROVIDING DYNAMIC SELECTION OF CACHE COHERENCE PROTOCOLS IN PROCESSOR-BASED DEVICES

FIELD OF THE DISCLOSURE

The technology of the disclosure relates to cache coherence protocols in processor-based devices, and, more particularly, to dynamic selection of cache coherence protocols.

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs. In this manner, conflicts that may arise between the PEs due to inconsistencies between local copies of the shared data can be avoided.

Conventional cache coherence protocols include write invalidate protocols and write update protocols. Under a write invalidate protocol, when one PE writes to a coherence granule (a subdivision of the system memory representing an aligned size in bytes on which cache coherence is managed), all copies of the coherence granule stored in the local caches of the other PEs are invalidated, with dirty (i.e., modified) copies of the coherence granule being written to the system memory before being invalidated. A PE that loses a cached copy of the coherence granule in this manner may subsequently re-obtain a copy of the coherence granule via a memory load operation after the memory store operation that triggered the invalidation is completed. In contrast, under a write update protocol, when one PE writes new data to the coherence granule, all other PEs receive a copy of the new data, and update their respective local copies of the coherence granule using the new data. Consequently, the write update protocol does not require invalidation of any local cached copies of the coherence granule, and thus no additional memory load operations are needed to re-obtain a lost coherence granule.

The relative efficiency of the write invalidate protocol and the write update protocol may depend on the circumstances under which each PE is operating. In general, the write invalidate protocol is more efficient than the write update protocol in scenarios where many subsequent memory, store operations to the same coherence granule are performed by a PE, and where the updated coherence granule is unlikely to be read by another PE in the near term. For example, when a software thread migrates from a first PE to a second PE, it is more efficient for a memory store operation from the second PE to invalidate a local cached copy of the coherence granule in the first PE than it would be to update the value of the local cached copy of the coherence granule in the first PE. The write update protocol, though, is more efficient than the write invalidate protocol when a memory store operation to a coherence granule is followed by memory load operations on the same coherence granule by multiple PEs. In this scenario, the write update protocol ensures that all PEs holding a local cached copy of the coherence granule receive an updated copy, whereas the write invalidate protocol in the same scenario would require PEs holding local cached copies of the coherence granule to invalidate their now-stale copies, and then perform memory load operations by sending individual read bus commands to a central ordering point (COP) to read the updated value.

Thus, while the write invalidate protocol and the write update protocol each have advantages in particular circumstances, neither is equally efficient in all scenarios. Moreover, information useful in determining which cache coherence protocol would be most efficient in a given scenario may not be accessible by a single entity such as the COP, but rather may be distributed among one or more of the master PE, the snooper PEs, and the COP. Accordingly, it is desirable to provide a mechanism by which an appropriate cache coherence protocol may be used according to existing circumstances at the time a memory store operation is performed.

SUMMARY

Exemplary embodiments disclosed herein include providing dynamic selection of cache coherence protocols in processor-based devices. In this regard, in one exemplary embodiment, a processor-based device comprises a plurality of processing elements (PEs), including a master PE and at least one snooper PE, as well as a central ordering point (COP). As used herein, the term "master PE" refers to a PE that performs a memory store operation, and that sends cache coherence bus commands to the COP. The term "snooper PE" refers to a PE that receives snoop commands associated with the memory store operation from the COP, and then acts on the snoop commands to maintain cache coherence. Accordingly, a PE may operate as a master PE with respect to one memory store operation, and may also operate as a snooper PE with respect to a different memory store operation.

The COP of the processor-based device is configured to dynamically select, on a store-by-store basis, either the write invalidate protocol or the write update protocol as the cache coherence protocol to use for maintaining cache coherency for a memory store operation by the master PE. The selection is made by the COP based on one or more protocol preference indicators that may be generated and provided by one or more of the master PE, the at least one snooper PE, and the COP itself. For example, in some embodiments, the master PE may predict, based on conditions known to the master PE, that the write update protocol is not advantageous in its current circumstances, and may, prevent the write update protocol from being used for a memory store operation. Likewise, some embodiments may provide that one or more of the COP and the at least one snooper PE may indicate a preference for the write update protocol based on knowledge available to each (e.g., a number of PEs holding a local cached copy of the coherence granule, or a likelihood of subsequent re-reading of the coherence granule, as non-limiting examples). After selecting the cache coherence protocol to use based on the one or more protocol preference indicators, the COP sends a response message to each of the master PE and the at least one snooper PE indicating the selected cache coherence protocol for the memory store operation.

In another exemplary embodiment, a processor-based device is provided. The processor-based device comprises a plurality of PEs that include a master PE and at least one snooper PE. The processor-based device further comprises a COP. The master PE is configured to send a cache coherence bus command to the COP as part of a memory store operation. The COP is configured to, responsive to receiving the cache coherence bus command sent by the master PE, dynamically select, on a store-by-store basis, one of a write invalidate protocol and a write update protocol as a cache coherence protocol to use for maintaining cache coherency, based on one or more protocol preference indicators provided by one or more of the master PE, the at least one snooper PE, and the COP. The COP is further configured to send a response message to each of the master PE and the at least one snooper PE indicating the selected cache coherence protocol.

In another exemplary embodiment, a method for dynamically selecting cache coherence protocols in processor-based devices is provided. The method comprises sending, by a master PE of a plurality of PEs of a processor-based device, a cache coherence bus command to a COP of the processor-based device as part of a memory store operation. The method further comprises, responsive to receiving the cache coherence bus command, dynamically selecting, by the COP on a store-by-store basis, one of a write invalidate protocol and a write update protocol as a cache coherence protocol to use for maintaining cache coherency, based on one or more protocol preference indicators provided by one or more of the master PE, at least one snooper PE of the plurality of PEs, and the COP. The method also comprises sending, by the COP, a response message to each of the master PE and the at least one snooper PE indicating the selected cache coherence protocol.

In another exemplary embodiment, a non-transitory computer-readable medium having stored thereon computer-executable instructions is provided. The computer-executable instructions, when executed by a processor, cause the processor to send, by a master processing element (PE) of a plurality of PEs of the processor, a cache coherence bus command to a central ordering point (COP) of the processor as part of a memory store operation. The computer-executable instructions further cause the processor to, responsive to receiving the cache coherence bus command, dynamically select, by the COP on a store-by-store basis, one of a write invalidate protocol and a write update protocol as a cache coherence protocol to use for maintaining cache coherency, based on one or more protocol preference indicators provided by one or more of the master PE, at least one snooper PE of the plurality of PEs, and the COP. The computer-executable instructions also cause the processor to send, by the COP, a response message to each of the master PE and the at least one snooper PE indicating the selected cache coherence protocol.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

FIGS. 2A-2C are message flow diagrams illustrating exemplary communication flows between the master PE, the snooper PEs, and the COP of FIG. 1 for dynamically selecting a cache coherence protocol, according to some embodiments;

Figure 1:
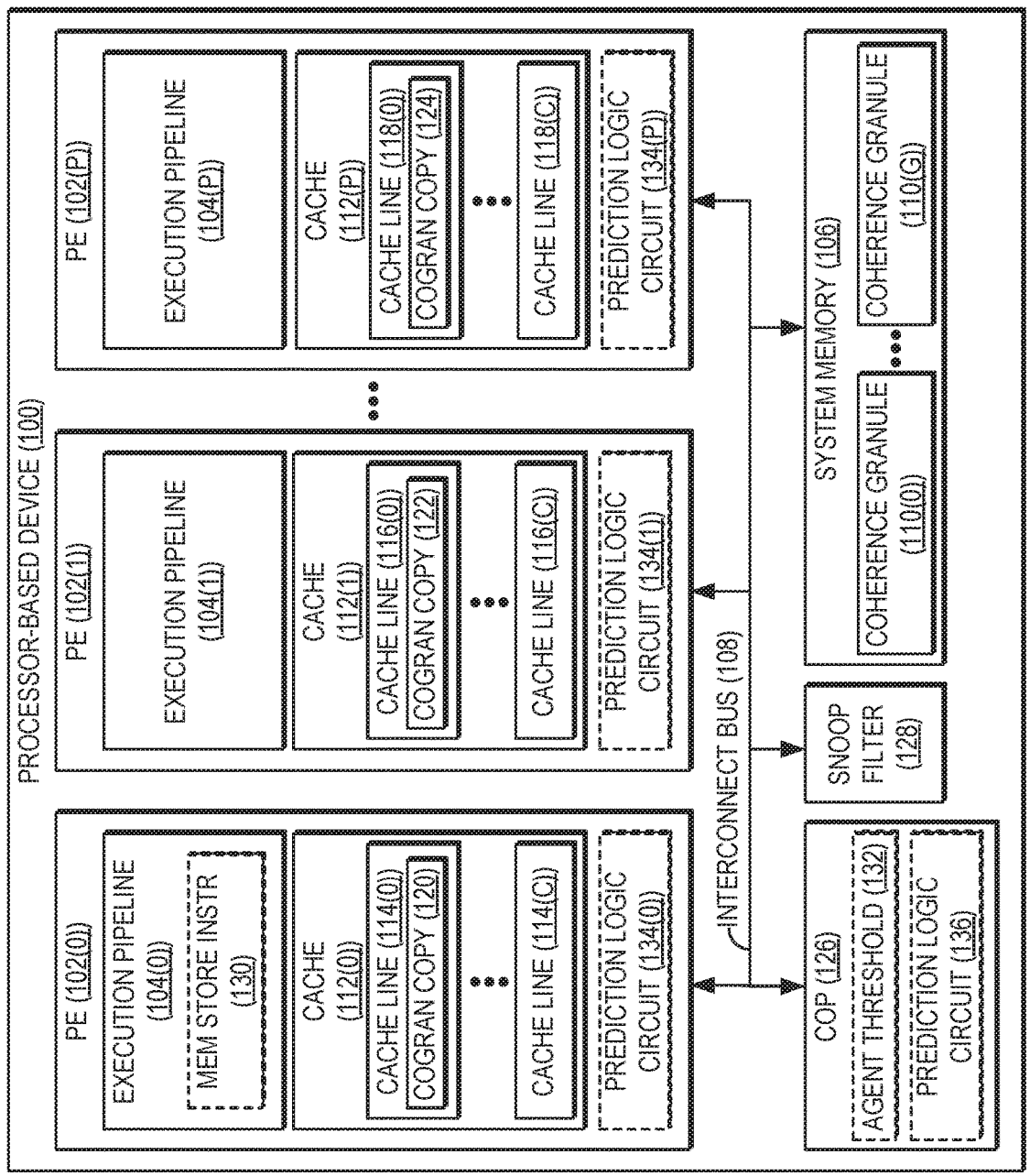
FIG. 1 is a block diagram illustrating an exemplary processor-based device configured to provide dynamic selection of cache coherence protocols using protocol preference indicators provided by one or more of a master processing element (PE), at least one snooper PE, and a central ordering point (COP) of the processor-based device.
Figure 6A:
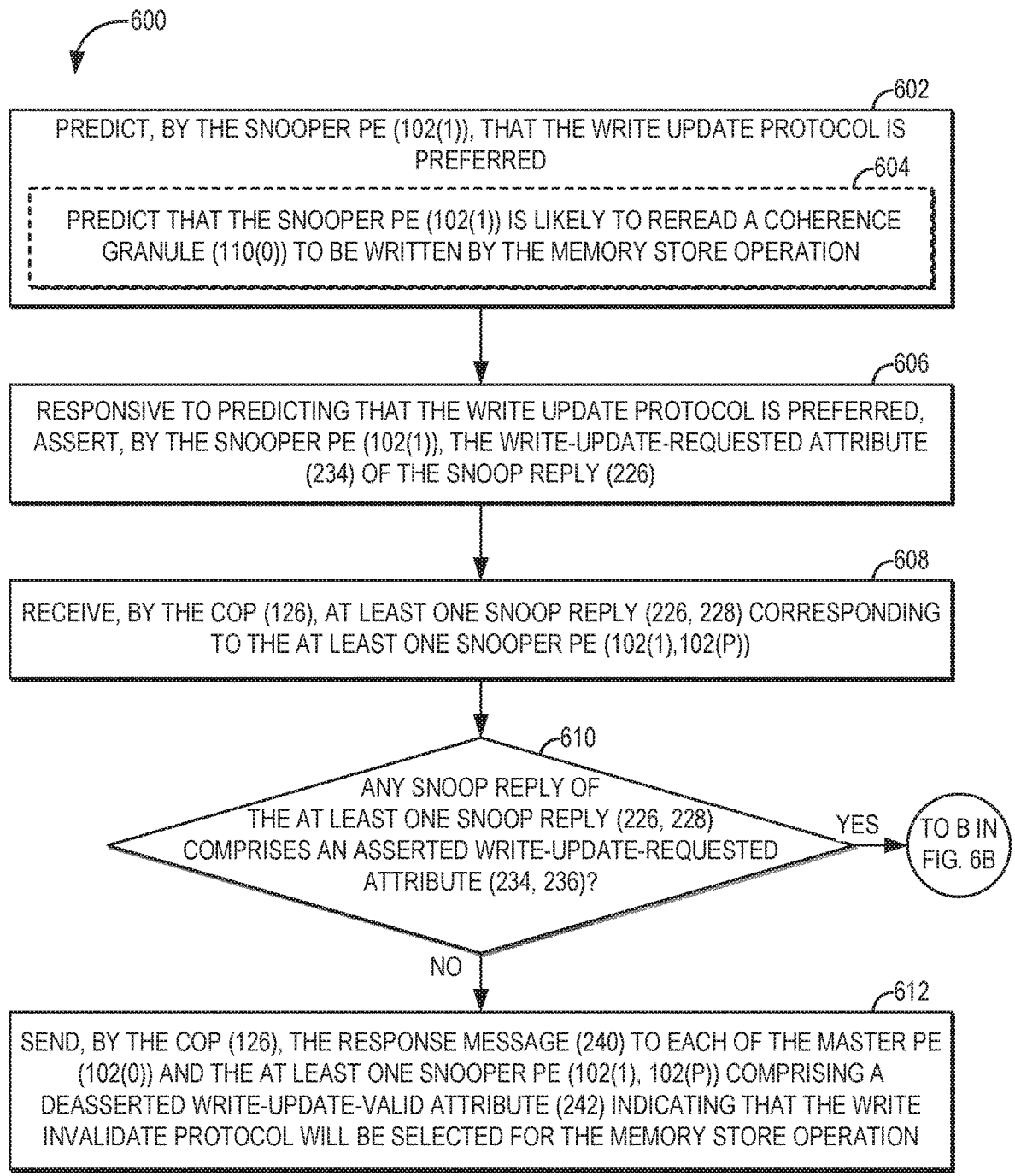
Figure 6B:
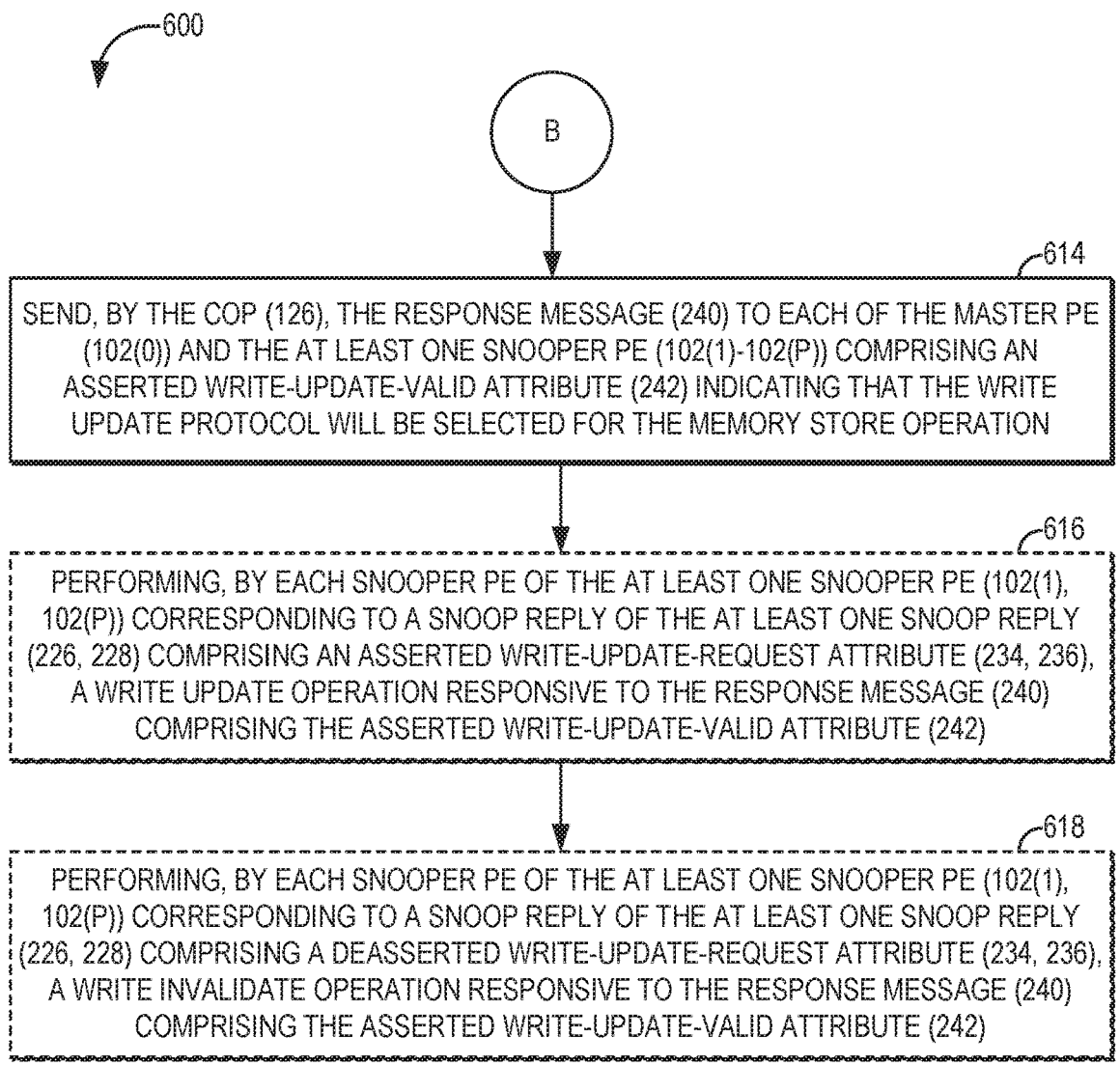
Figure 7:
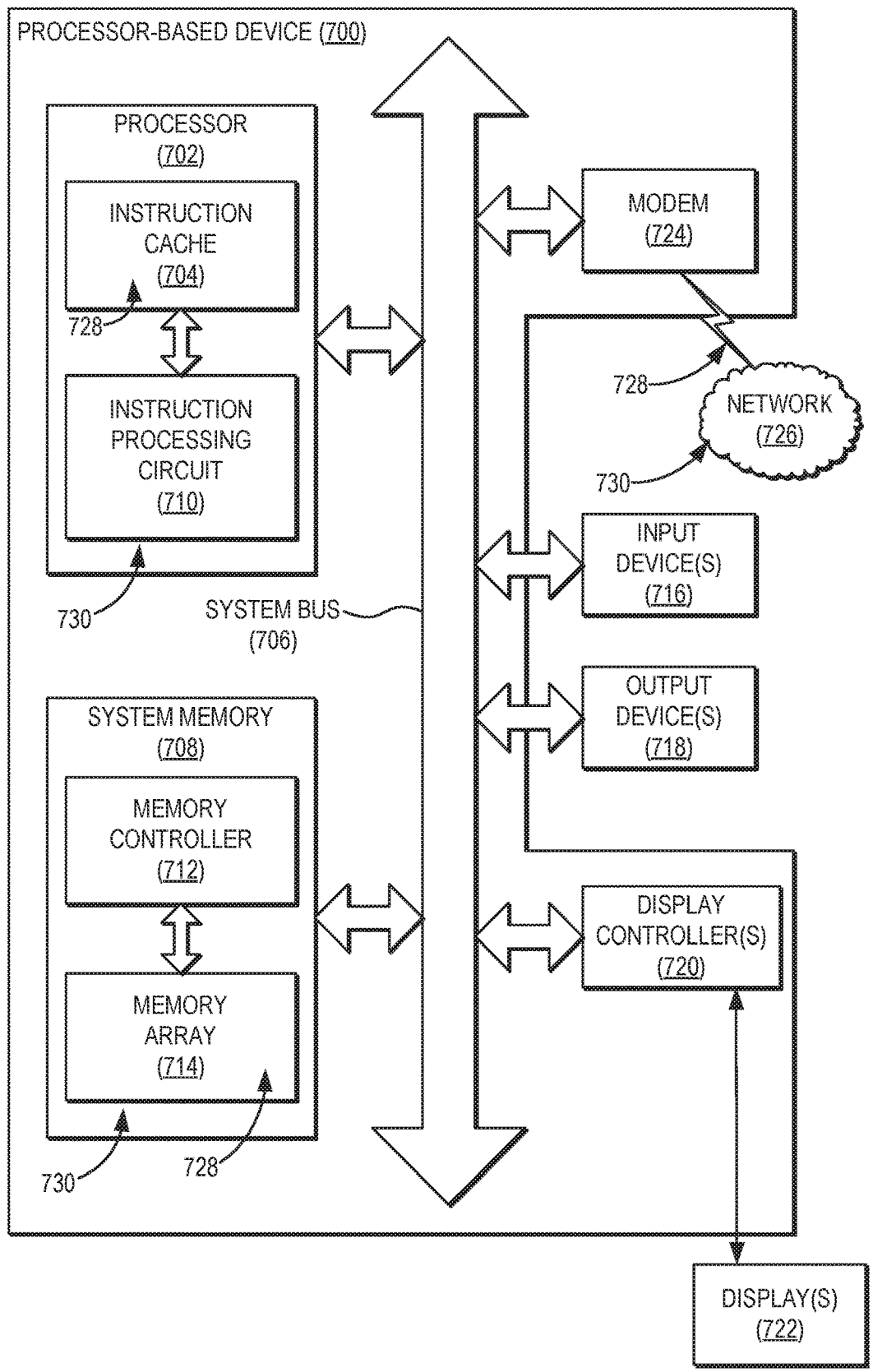

FIGS. 6A and 6B are flowcharts illustrating exemplary operations of the snooper PEs of FIG. 1 for predicting that a write update protocol is preferred, and providing protocol preference indicators to the COP, according to one embodiment; and FIG. 7 is a block diagram of an exemplary processor-based device, such as the processor-based device of FIG. 1, that is configured to provide dynamic selection of cache coherence protocols using protocol preference indicators.

DETAILED DESCRIPTION

Exemplary embodiments disclosed herein include providing dynamic selection of cache coherence protocols in processor-based devices. In this regard, in one exemplary embodiment, a processor-based device comprises a plurality of processing elements (PEs), including a master PE and at least one snooper PE, as well as a central ordering point (COP). The COP of the processor-based device is configured to dynamically select, on a store-by-store basis, either the write invalidate protocol or the write update protocol as the cache coherence protocol to use for maintaining cache coherency for a memory store operation by the master PE. The selection is made by the COP based on one or more protocol preference indicators that may be generated and provided by one or more of the master PE, the at least one snooper PE, and the COP itself. For example, in some embodiments, the master PE may predict, based on conditions known to the master PE, that the write update protocol is not advantageous in its current circumstances, and may prevent the write update protocol from being used for a memory store operation. Likewise, some embodiments may provide that one or more of the COP and the at least one snooper PE may indicate a preference for the write update protocol based on knowledge available to each (e.g., a number of PEs holding a local cached copy of the coherence granule, or a likelihood of subsequent re-reading of the coherence granule, as non-limiting examples). After selecting the cache coherence protocol to use, the COP sends a response message to each of the master PE and the at least one snooper PE indicating the selected cache coherence protocol.

In this regard, FIG. 1 illustrates an exemplary processor-based device 100 that provides a plurality of processing elements (PEs) 102(0)-102(P) for processing executable instructions. Each of the PEs 102(0)-102(P) may comprise, e.g., an individual processor core comprising a logical execution unit and associated caches and functional units. In the example of FIG. 1, each of the PEs 102(0)-102(P)

includes a corresponding execution pipeline 104(0)-104(P) that is configured to perform out-of-order execution of an instruction stream comprising computer-executable instructions. As non-limiting examples, the execution pipelines 104(0)-104(P) each may include a fetch stage for retrieving instructions for execution, a decode stage for translating fetched instructions into control signals for instruction execution, a rename stage for allocating physical register file (PRF) registers, a dispatch stage for issuing instructions for execution, an execute stage for sending instructions and operands to execution units, and/or a commit stage for irrevocably updating the architectural state of the corresponding PE 102(0)-102(P) based on the results of instruction execution.

The PEs 102(0)-102(P) of the processor-based device 100 of FIG. 1 are interconnected to each other and to a system memory 106 by an interconnect bus 108. As seen in FIG. 1, the system memory 106 is subdivided into multiple coherence granules 110(0)-110(G), each representing the smallest unit of memory (e.g., 64 bytes, as a non-limiting example) for which cache coherence is maintained by the processor-based device 100. The PEs 102(0)-102(P) also include corresponding caches 112(0)-112(P) comprising cache lines 114(0)-114(C), 116(0)-116(C), and 118(0)-118(C), respectively. It is to be understood that the PEs 102(0)-102(P) may include caches in addition to the caches 112(0)-112(P) illustrated in FIG. 1. The caches 112(0)-112(P) are used by the respective PEs 102(0)-102(P) to locally store data loaded from the system memory 106 for quicker access. For example, as seen in FIG. 1, the cache lines 114(0), 116(0), and 118(0) of the corresponding caches 112(0)-112(P) store local copies ("COGRAN COPY") 120, 122, and 124, respectively, of one of the coherence granules 110(0)-110(G) (e.g., the coherence granule 110(0), as a non-limiting example).

The processor-based device 100 further includes a central ordering point (COP) 126 that is configured to arbitrate among cache coherence bus commands received from master PEs among the PEs 102(0)-102(P), direct snoop commands to and receive snoop replies from snooper PEs among the PEs 102(0)-102(P), and send response messages to both master PEs and snooper PEs among the PEs 102(0)-102(P). The COP 126 may work in conjunction with a snoop filter 128 that is configured to monitor traffic on the interconnect bus 108 to track coherence states of the cache lines 114(0)-114(C), 116(0)-116(C), and 118(0)-118(C) of the PEs 102(0)-102(P).

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, each of the PEs 102(0)-102(P) may further include one or more functional units, instruction caches, unified caches, memory controllers, interconnect buses, and/or additional memory devices, caches, and/or controller circuits, which are omitted from FIG. 1 for the sake of clarity.

As noted above, conventional processor-based devices provide support for cache coherence protocols, such as the write invalidate protocol and the write update protocol, to enable local changes to the shared data within one PE 102(0)-102(P) to be propagated to other PEs 102(0)-102(P) to ensure that all of the PEs 102(0)-102(P) have a consistent view of the shared data. However, while the write invalidate protocol and the write update protocol each have advantages in particular circumstances, neither is equally efficient in all scenarios. Moreover, information that may be used in determining which cache coherence protocol would be most efficient in a given scenario may not be accessible by a single entity such as the COP 126 of FIG. 1, but rather may be distributed among one or more of a master PE among the PEs 102(0)-102(P), snooper PEs among the PEs 102(0)-102(P), and the COP 126.

In this regard, the processor-based device 100 of FIG. 1 is configured to provide dynamic selection of cache coherence protocols. As discussed in greater detail below with respect to FIGS. 2A-2C, the COP 126 is configured to dynamically select a cache coherence protocol (i.e., either the write invalidate protocol or the write update protocol) to use for a given memory store operation based on one or more protocol preference indicators provided by one or more of a master PE among the PEs 102(0)-102(P), at least one snooper PE among the PEs 102(0)-102(P), and the COP 126 itself. The selection of a cache coherence protocol is performed by the COP 126 on a store-by-store basis, such that different cache coherence protocols may be selected for successive memory store operations. Accordingly, instead of supporting only one cache coherence protocol (as is the case with many conventional processor-based devices), the processor-based device 100 is configured to support both the write invalidate protocol and the write update protocol.

In some embodiments, the PEs 102(0)-102(P) and the COP 126 may be configured to provide one or more protocol preference indicators based on circumstantial knowledge available to each. For example, upon executing a memory store instruction ("MEM STORE INSTR") 130, the PE 102(0), acting as a master PE, may predict that the write invalidate protocol is preferred because the PE 102(0) is aware that it will be performing subsequent multiple memory store operations to a coherence granule such as the coherence granule 110(0). Similarly, the COP 126 may determine that a number of the PEs 102(0)-102(P) holding local cached copies 120, 122, and 124 of a highly shared and contentious coherence granule exceeds an agent threshold 132, and thus may predict that the write update protocol is preferred. Based on the one or more protocol preference indicators received by the COP 126, the COP 126 dynamically selects the cache coherence protocol, and then communicates the selected cache coherence protocol to the PEs 102(0)-102(P). The logic for generating, providing, and evaluating such protocol preference indicators may be embodied in prediction logic circuits 134(0)-134(P) of the PEs 102(0)-102(P) and/or in the prediction logic circuit 136 of the COP 126, as non-limiting examples.

Figure 2A:
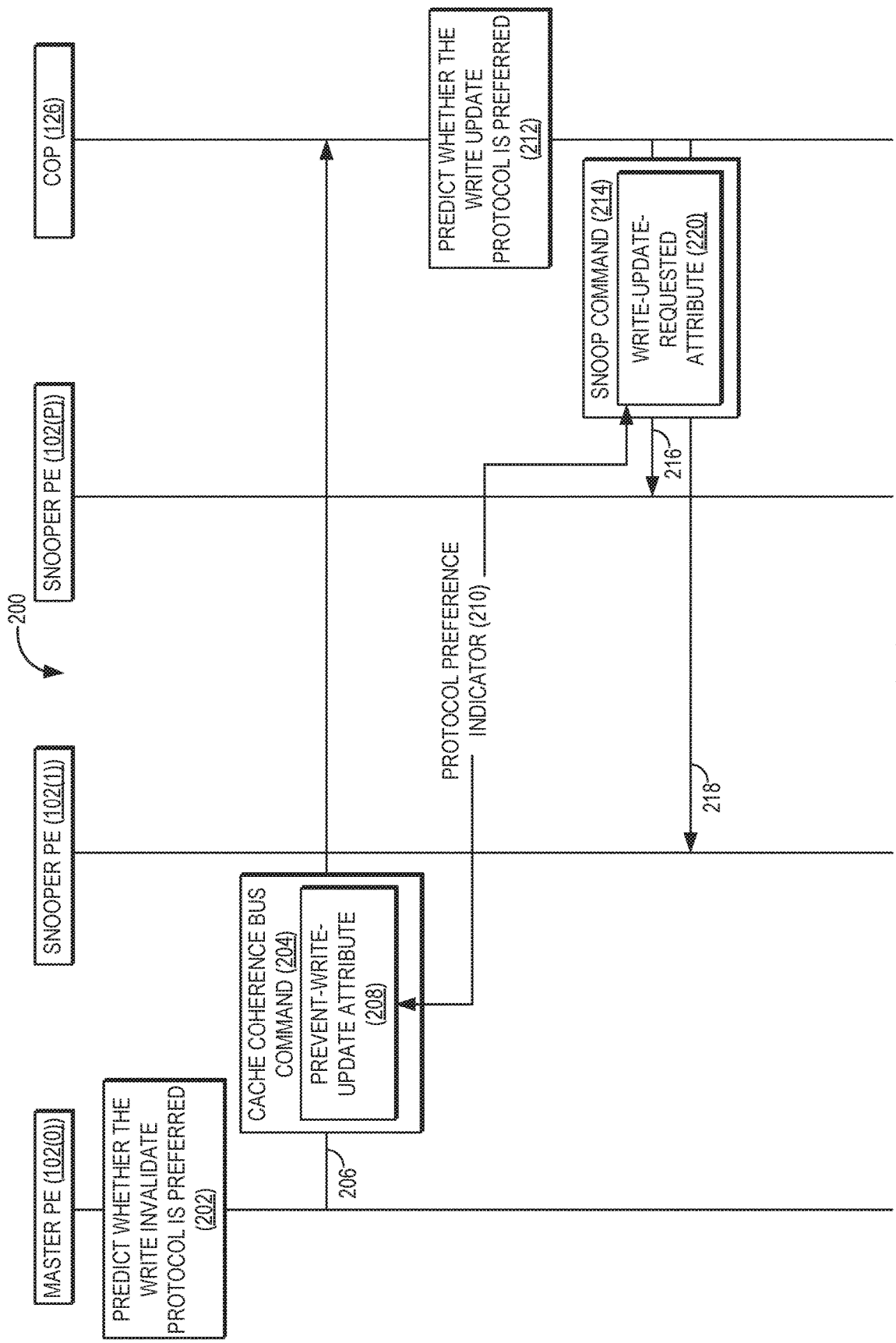
Figure 2C:
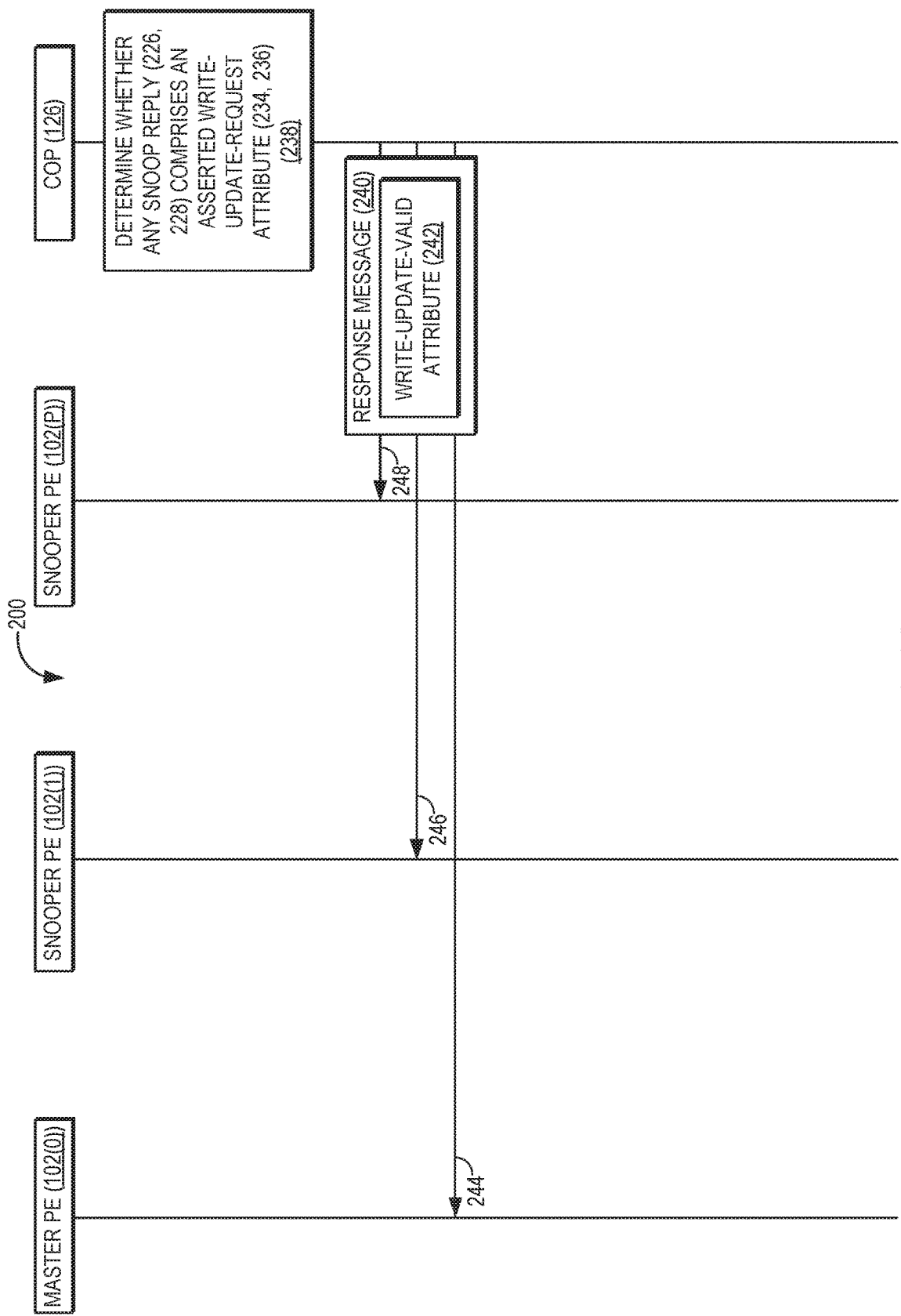

To illustrate communication flows among elements of the processor-based device 100 of FIG. 1 for generating and providing protocol preference indicators and dynamically selecting the cache coherence protocol, FIGS. 2A-2C are provided. Elements of FIG. 1 are referenced in describing FIGS. 2A-2C for the sake of clarity. As seen in FIGS. 2A-2C, a message flow diagram 200 shows the master PE 102(0), the snooper PEs 102(1) and 102(P), and the COP 126 represented by vertical lines, with communications between these elements illustrated by captioned arrows. It is to be understood that the PE 102(0) is referred to as a "master PE" and the PEs 102(1) and 102(P) are referred to as "snooper PEs" only for purposes of illustration, and that each of the PEs 102(0)-102(P) may operate as either a master PE or a snooper PE depending on its role in a particular memory store operation. It is to be further understood that not all of the operations illustrated in FIGS. 2A-2C may be performed by all embodiments.

In FIG. 2A, operations begin with the master PE 102(0), in response to a memory store operation performed by the master PE 102(0), predicting whether the write invalidate protocol is preferred, as indicated by block 202. Generally speaking, the master PE 102(0) may defer to other agents (such as the snooper PEs 102(1) and 102(P), the COP 126, hints provided by software, and the like, as non-limiting examples) to determine whether the write update protocol is preferred. However, the master PE 102(0) in some circumstances may predict that the write update protocol would be disadvantageous, and that the write invalidate protocol is preferred. For example, the master PE 102(0) in some embodiments may determine that the memory store operation will be one of a plurality of memory store operations to a same coherence granule (e.g., the coherence granule 110(0) of FIG. 1), and thus the write invalidate protocol is preferred. Some embodiments of the master PE 102(0) may further predict that the write invalidate protocol is preferred by determining that the memory store operation will not comprise an atomic read-modify-write operation to the coherence granule 110(0). Note that if the memory store operation did involve an atomic read-modify-write operation, the master PE 102(0) likely would prefer the write update protocol because the master PE 102(0) would probably be communicating with other executing threads using a shared memory variable.

In some embodiments, the master PE 102(0) may base its prediction on software-provided hints (communicated via, e.g., an opcode hint added to a memory store instruction, a page table attribute, or an address range register, as non-limiting examples). For instance, the use of some high-level software constructs, such as C++ atomic variables and Java volatile variables, may indicate that memory addresses associated with such constructs are used for shared memory communications between software threads. If the master PE 102(0) performs the memory store operation to a memory address associated with such constructs, it may be inferred that the snooper PEs 102(1) and 102(P) likely would need to perform subsequent memory load operations if the memory store operation resulted in the invalidation of local cached copies. Thus, if the master PE 102(0) detects a software-provided hint, the master PE 102(0) may predict that the write invalidate protocol is not preferred in those circumstances.

Based on its prediction, the master PE 102(0) sends a cache coherence bus command 204 to the COP 126 indicating its preferred cache coherence protocol, as indicated by arrow 206. The cache coherence bus command 204 comprises a prevent-write-update attribute 208 that is asserted or deasserted by the master PE 102(0) to indicate its preference to the COP 126. As seen in FIG. 2A, the prevent-write-update attribute 208 represents one possible embodiment of a protocol preference indicator 210, and may be generally referred to as such herein. In some embodiments, a prediction by the master PE 102(0) that the write invalidate protocol is preferred will be treated as definitive by the COP 126, allowing the master PE 102(0) to disallow the use of the write update protocol for a given memory store operation. Thus, as discussed in greater detail with respect to FIG. 2B, if the master PE 102(0) in such embodiments sends the cache coherence bus command 204 to the COP 126 with the prevent-write-update attribute 208 asserted, the COP 126 sends a response message to the master PE 102(0) and the snooper PEs 102(1) and 102(P) indicating that the write invalidate protocol is selected.

In some embodiments, the cache coherence bus command 204 may comprise a non-allocating-write bus command that is sent by the master PE 102(0) responsive to a cache miss on the cache 112(0), where the memory store operation is not write-allocating in the cache 112(0) of the master PE 102(0). Some embodiments may provide that the cache coherence bus command 204 comprises a read-with-intent-to-write bus command that is sent by the master PE 102(0) responsive to a cache miss on the cache 112(0), where the memory store operation is write-allocating in the cache 112(0) of the master PE 102(0). According to some embodiments, the cache coherence bus command 204 may comprise a promote-to-writeable bus command that is sent by the master PE 102(0) responsive to a cache hit on the cache 112(0), where the cache line (e.g., the cache line 114(0), as a non-limiting example) is held in a shared coherence state.

Upon receiving the cache coherence bus command 204 from the master PE 102(0), the COP 126 next makes its own prediction regarding whether the write update protocol is preferred, as indicated by block 212. Some embodiments may provide that prediction by the COP 126 is based on whether or not the prevent-write-update attribute 208 of the cache coherence bus command 204 is asserted. In some embodiments, the COP 126 may base its prediction on how many of the PEs 102(0)-102(P) hold local cached copies (e.g., the local cached copies 120, 122, and 124 of FIG. 1) of the coherence granule 110(0) to be written by the memory store operation. If the number of PEs 102(0)-102(P) holding the local cached copies 120, 122, and 124 exceeds the agent threshold 132, the COP 126 in such embodiments will predict that the write update protocol is preferred for servicing the memory store operation. In some embodiments, the number of PEs 102(0)-102(P) holding the local cached copies 120, 122, and 124 may be determined by the COP 126 consulting the snoop filter 128 of FIG. 1 or another snoop directory (not shown) of the processor-based device 100.

After making its prediction, the COP 126 sends a snoop command 214 to the snooper PEs 102(1) and 102(P), as indicated by arrows 216 and 218, respectively. The snoop command 214 comprises a write-update-requested attribute 220 that is asserted or deasserted by the COP 126 to indicate its cache coherence protocol preference to the snooper PEs 102(1) and 102(P). As rioted above, in some embodiments, the COP 126 may deassert the write-update-requested attribute 220 if the master PE 102(0) sends the cache coherence bus command 204 with the prevent-write-update attribute 208 asserted. It is to be understood that, as shown in FIG. 2A, the write-update-requested attribute 220 represents another possible embodiment of the protocol preference indicator 210, and thus may be generally referred to as such herein. Operations then resume in FIG. 2B.

Referring now to FIG. 2B, each of the snooper PEs 102(1) and 102(P) may also independently predict whether the write update protocol is preferred, as indicated by blocks 222 and 224, respectively. In this manner, the snooper PEs 102(1) and 102(P) may acknowledge participation in or opt out of a requested write update (as indicated by the write-update-requested attribute 220 of the snoop command 214 being asserted), or may request the write update protocol if the write-update-requested attribute 220 of the snoop command 214 is deasserted. In the former case, if the write-update-requested attribute 220 of the snoop command 214 is asserted by the COP 126, each of the snooper PEs 102(1) and 102(P) may default to using the write update protocol unless it determines that a reason exists to opt out. As non-limiting examples, a snooper PE such as the snooper PEs 102(1) and 102(P) may decide to opt out of the use of the write update protocol because the snooper PE is unwilling to receive write update data due to a lack of resources or due to operating in a configuration in which reception of write update data is disabled. Conversely, if the write-update-requested attribute 220 of the snoop command 214 is deasserted by the COP 126, each of the snooper PEs 102(1) and 102(P) may still request the write update protocol based on its own prediction of the benefits of using the write update protocol.

According to some embodiments, the snooper PEs 102(1) and 102(P) each may base their respective predictions regarding whether the write update protocol is preferred on the likelihood of rereading the coherence granule 110(0) that is to be written by the memory store operation. If so, the snooper PEs 102(1) and 102(P) would indicate a preference for the write update protocol. In some embodiments, the snooper PEs 102(1) and 102(P) each may determine the likelihood of rereading the coherence granule 110(0) based on a position of the local cached copies 122 and 124 in the caches 112(1) and 112(P), respectively, as determined by the cache replacement policies of the caches 112(1) and 112(P). For example, if the cache 112(1) uses a Least Recently Used (LRU) replacement policy, the snooper PE 102(1) may determine that it is likely to reread the coherence granule 110(0) if the cache line 116(0) is installed between a most-recently-used cache line and the halfway point between the most-recently-used cache line and the least-recently-used cache line in the cache 112(1).

Some embodiments may provide that the snooper PEs 102(1) and 102(P) each may determine the likelihood of rereading the coherence granule 110(0) by determining whether the local cached copies 122 and 124 are held in an exclusive state at the time the corresponding snooper PEs 102(1) and 102(P) receive the snoop command 214 from the COP 126. In some embodiments, the snooper PEs 102(1) and 102(P) each may determine the likelihood of rereading the coherence granule 110(0) by determining whether the local cached copies 122 and 124 are held in a modified or owned state, but the corresponding snooper PEs 102(1) or 102(P) have not written to the coherence granule 110(0). In either case, if the determinations are true, the snooper PEs 102(1) and 102(P) are likely to be communicating with other software threads via a shared memory, variable, and thus would predict the write update protocol to be the preferred cache coherence protocol.

After predicting whether the write update protocol is preferred, the snooper PEs 102(1) and 102(P) send snoop replies 226 and 228, respectively, to the COP 126, as indicated by arrows 230 and 232. The snoop replies 226 and 228 comprise write-update-requested attributes 234 and 236, respectively, which are asserted or deasserted depending on whether or not the corresponding snooper PEs 102(1) and 102(P) predicted the write update protocol to be preferred. It is to be understood that, as shown in FIG. 2B, the write-update-requested attributes 234 and 236 represent further possible embodiments of the protocol preference indicator 210, and thus may be generally referred to as such herein. Operations then resume in FIG. 2C.

Turning now to FIG. 2C, upon receiving the snoop replies 226 and 228, the COP 126 in some embodiments may then determine whether either of the snoop replies 226 and 228 comprises an asserted write-update-requested attribute 234 or 236, respectively, as indicated by block 238. Assuming that the master PE 102(0) has not precluded the use of the write update protocol (i.e., by asserting the prevent-write-update attribute 208 to indicate that the write invalidate protocol will be selected), the COP 126 will then generate a response message 240 with a write-update-valid attribute 242 that is asserted or deasserted based on the write-update-requested attributes 234 and 236, and will send the response message 240 to the master PE 102(0) and the snooper PEs 102(1) and 102(P), as indicated by arrows 244, 246, and 248, respectively. Because the snooper PEs 102(1) and 102(P) independently determine whether the write update protocol is preferred, it may be possible for both of the write-update-requested attributes 234 and 236 to be asserted, for only one of the two to be asserted, or for both to be deasserted. If any one of the write-update-requested attributes 234 and 236 are asserted (and the prevent-write-update attribute 208 of the cache coherence bus command 204 sent by the master PE 102(0) was not asserted), the COP 126 will assert the write-update-valid attribute 242 of the response message 240. However, if both of the write-update-requested attributes 234 and 236 are deasserted (or if the prevent-write-update attribute 208 of the cache coherence bus command 204 sent by the master PE 102(0) was asserted), the COP 126 will deassert the write-update-valid attribute 242 of the response message 240.

The write-update-valid attribute 242 of the response message 240 indicates to the master PE 102(0) and the snooper PEs 102(1) and 102(P) the cache coherence protocol that will be selected by the COP 126 for the memory store operation. Upon receiving the response message 240 with the write-update-valid attribute 242 asserted, the master PE 102(0) will perform the write update by sending data to the snooper PEs 102(1), 102(P) for use in updating their local cached copies 122 and 124, respectively. Likewise, upon receiving the response message 240 with the write-update-valid attribute 242 asserted, any of the snooper PEs 102(1), 102(P) whose snoop reply 226, 228 included the write-update-requested attribute 234, 236 asserted will prepare to receive write update data from the master PE 102(0). Any of the snooper PEs 102(1), 102(P) whose snoop reply 226, 228 included the write-update-requested attribute 234, 236 deasserted will ignore the write-update-valid attribute 242 in the response message 240, and will perform a write invalidate.

The mechanism for dynamic selection of cache coherence protocols described herein allows either the write invalidate protocol or the write update protocol to be selected on a store-by-store basis by the COP 126 based on input from one or more of the master PE 102(0), the snooper PEs 102(1) and 102(P), and the COP 126 itself. In this manner, the cache coherence protocol providing the best performance and/or the lowest energy consumption may be employed for each memory store operation that finds a cached copy of a coherence granule in another PE 102(0)-102(P).

Figure 3:
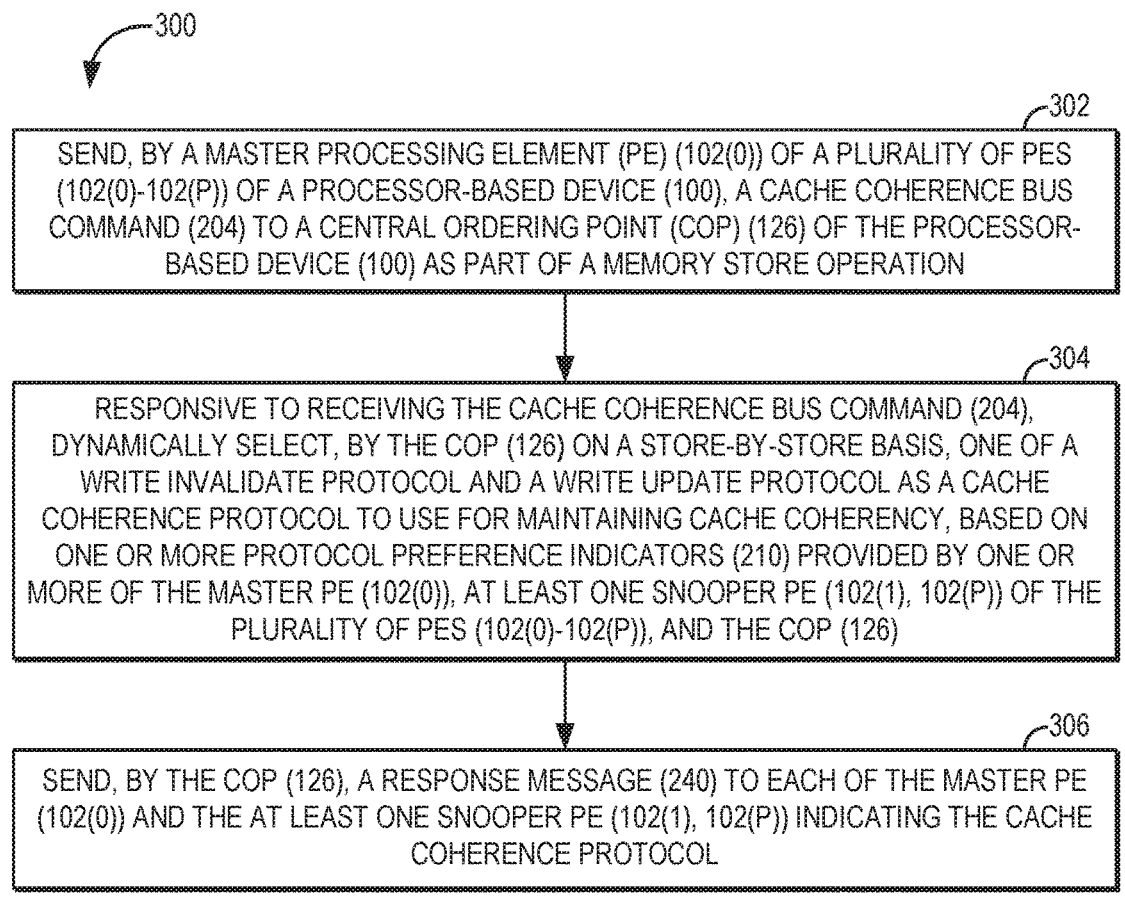
FIG. 3 is a flowchart illustrating exemplary operations for providing dynamic selection of cache coherence protocols, according to one embodiment.

To illustrate exemplary operations for providing dynamic selection of cache coherence protocols according to some embodiments, FIG. 3 provides a flowchart 300. For the sake of clarity, elements of FIGS. 1 and 2A-2C are referenced in describing FIG. 3. Operations in FIG. 3 begin with the master PE 102(0) of the plurality of PEs 102(0)-102(P) of the processor-based device 100 sending the cache coherence bus command 204 to the COP 126 of the processor-based device 100 as part of a memory store operation (block 302). Responsive to receiving the cache coherence bus command 204, the COP 126 dynamically selects, on a store-by-store basis, one of a write invalidate protocol and a write update protocol as a cache coherence protocol to use for maintaining cache coherency, based on one or more protocol preference indicators 210 provided by one or more of the master PE 102(0), at least one snooper PE 102(1), 102(P) of the plurality of PEs 102(0)-102(P), and the COP 126 (block 304). The COP 126 then sends the response message 240 to each of the master PE 102(0) and the at least one snooper PE 102(1), 102(P) indicating the selected cache coherence protocol (block 306).

Figure 4:
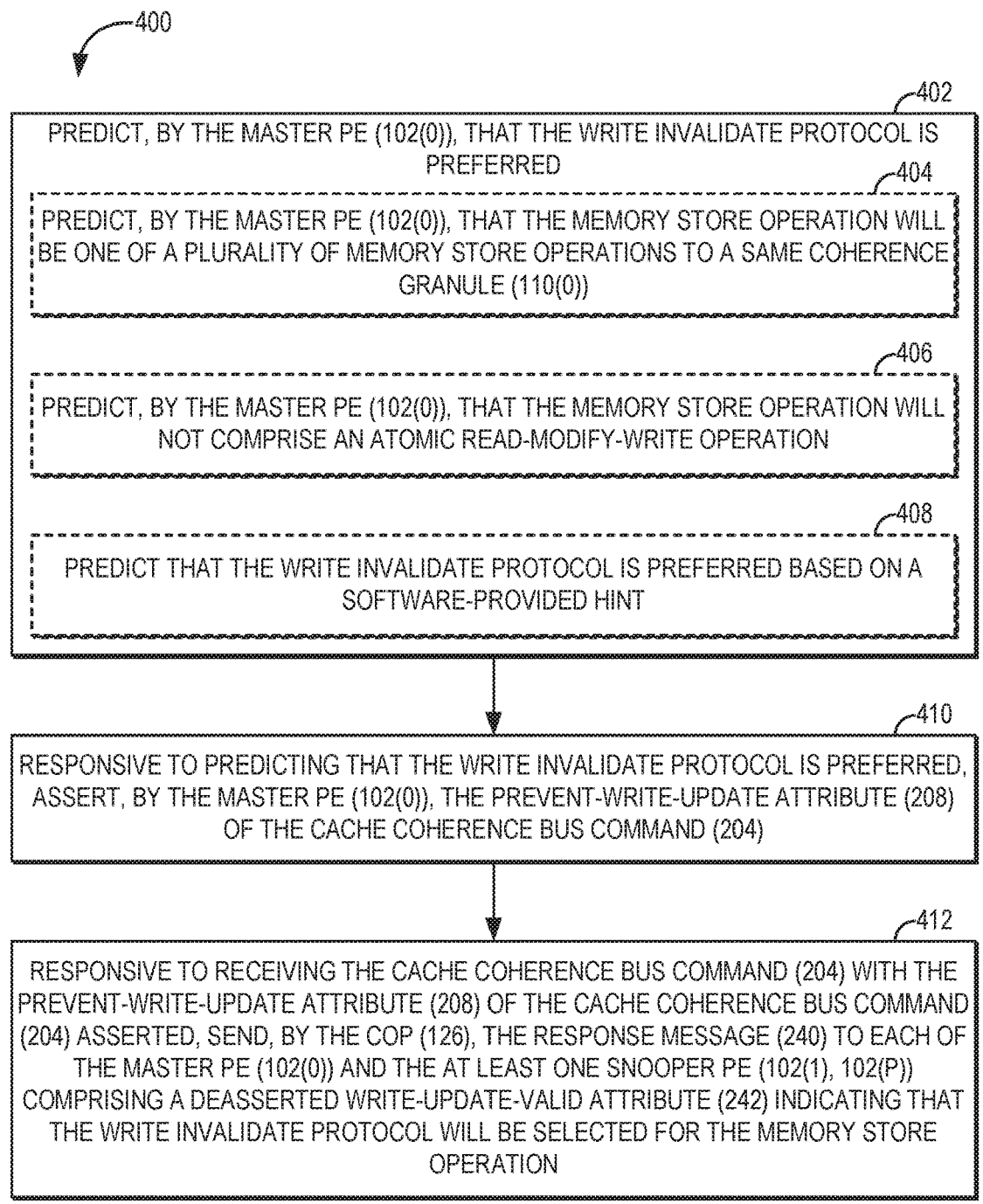
FIG. 4 is a flowchart illustrating further exemplary operations of the master PE of FIG. 1 for predicting that a write invalidate protocol is preferred, and providing protocol preference indicators to the COP, according to one embodiment.

FIG. 4 provides a flowchart 400 illustrating further exemplary operations of the master PE 102(0) of FIGS. 1 and 2A-2C for predicting that a write invalidate protocol is preferred, and providing protocol preference indicators 210 to the COP 126, according to one embodiment. Elements of FIGS. 1 and 2A-2C are referenced in describing FIG. 4 for the sake of clarity. In FIG. 4, operations begin with the master PE 102(0) predicting that the write invalidate protocol is preferred (block 402). In some embodiments, the operations of block 402 for predicting that the write invalidate protocol is preferred may comprise the master PE 102(0) predicting that the memory store operation will be one of a plurality of memory store operations to a same coherence granule (e.g., the coherence granule 110(0), as a non-limiting example) (block 404). Some embodiments may provide that the operations of block 402 for predicting that the write invalidate protocol is preferred comprise the master PE 102(0) predicting that the memory store operation will not comprise an atomic read-modify-write operation (block 406). According to some embodiments, the operations of block 402 for predicting that the write invalidate protocol is preferred may be based on a software-provided hint (block 408).

Responsive to predicting that the write invalidate protocol is preferred, the master PE 102(0) asserts the prevent-write-update attribute 208 of the cache coherence bus command 204 (block 410). The COP 126, in response to receiving the cache coherence bus command 204 with the prevent-write-update attribute 208 of the cache coherence bus command 204 asserted, sends the response message 240 to each of the master PE 102(0) and the at least one snooper PE 102(1). 102(P) comprising a deasserted write-update-valid attribute 242 indicating that the write invalidate protocol will be selected for the memory store operation (block 412).

Figure 5:
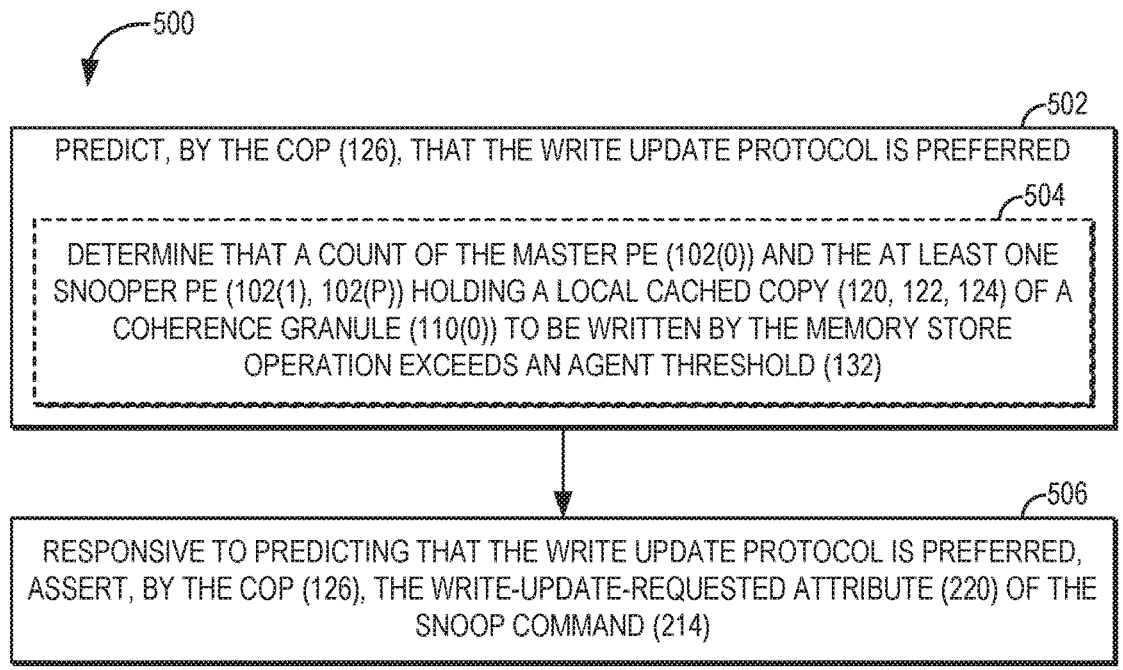
FIG. 5 is a flowchart illustrating exemplary operations of the COP of FIG. 1 for predicting that a write update protocol is preferred, according to one embodiment.

To illustrate exemplary operations of the COP 126 of FIG. 1 for predicting that a write update protocol is preferred according to one embodiment, FIG. 5 provides a flowchart 500. For the sake of clarity, elements of FIGS. 1 and 2A-2C are referenced in describing FIG. 5. Operations in FIG. 5 begin with the COP 126 predicting that the write update protocol is preferred (block 502). In some embodiments, the operations of block 502 for predicting that the write update protocol is preferred may comprise determining that a count of the master PE 102(0) and the at least one snooper PE 102(1), 102(P) holding the local cached copy 120, 122, 124 of the coherence granule 110(0) to be written by the memory store operation exceeds an agent threshold 132 (block 504). Responsive to predicting that the write update protocol is preferred, the COP 126 asserts the write-update-requested attribute 220 of the snoop command 214 (block 506).

FIGS. 6A and 6B provide a flowchart 600 illustrating exemplary operations of the snooper PEs 102(1) and 102(P) of FIGS. 1 and 2A-2C for predicting that a write update protocol is preferred, and providing protocol preference indicators 210 to the COP 126, according to one embodiment. In aspects according to FIGS. 6A and 6B, it is assumed that the cache coherence bus command 204 sent by the master PE 102(0) to the COP 126 with its prevent-write-update attribute 208 deasserted, thus allowing the COP 126 and the snooper PEs 102(1) and 102(P) to make their own predictions regarding the preferred cache coherence protocol. Elements of FIGS. 1 and 2A-2C are referenced in describing FIGS. 6A and 6B for the sake of clarity. In FIG. 6A, operations begin with a snooper PE, such as the snooper PE 102(1), predicting that the write update protocol is preferred (block 602). In some embodiments, the operations of block 602 for predicting that the write update protocol is preferred may comprise predicting that the snooper PE 102(1) is likely to reread the coherence granule 110(0) to be written by the memory store operation (block 604). The snooper PE 102(1) in some embodiments may predict that the snooper PE 102(1) is likely to reread the coherence granule 110(0) based on a position of the local cached copy 122 in the cache 112(1) as determined by the cache replacement policies of the cache 112(1). Some embodiments may provide that the snooper PE 102(1) may predict that the snooper PE 102(1) is likely to reread the coherence granule 110(0) by determining that the local cached copy 122 is held in an exclusive state at the time the snooper PE 102(1) receives the snoop command 214 from the COP 126, or by determining that the local cached copy 122 is held in a modified or owned state but the snooper PEs 102(1) has not written to the coherence granule 110(0).

Responsive to predicting that the write update protocol is preferred, the snooper PE 102(1) asserts the write-update-requested attribute 234 of the snoop reply 226 (block 606). The COP 126 subsequently receives at least one snoop reply 226, 228 corresponding to the at least one snooper PE 102(1), 102(P) (block 608). The COP 126 then determines whether any snoop reply of the at least one snoop reply 226, 228 comprises an asserted write-update-requested attribute 234, 236 (block 610). If not, the COP 126 sends the response message 240 to each of the master PE 102(0) and the at least one snooper PE 102(1). 102(P) comprising the deasserted write-update-valid attribute 242 indicating that the write invalidate protocol will be selected for the memory store operation (block 612). If the COP 126 determines at decision block 610 that any of the at least one snoop reply 226, 228 comprises an asserted write-update-requested attribute 234, 236, processing resumes at block 614 in FIG. 6B.

Referring now to FIG. 6B, the COP 126 sends the response message 240 to each of the master PE 102(0) and the at least one snooper PE 102(1), 102(P) comprising an asserted write-update-valid attribute 242 indicating that the write update protocol will be selected for the memory store operation (block 614). In some embodiments, upon receiving the response message 240 comprising the asserted write-update-valid attribute 242, each snooper PE of the at least one snooper PE 102(1), 102(P) that corresponds to a snoop reply of the at least one snoop reply 226, 228 comprising an asserted write-update-requested attribute 234, 236 may perform a write update operation (block 616). Likewise, each snooper PE of the at least one snooper PE 102(1), 102(P) that corresponds to a snoop reply of the at least one snoop reply 226, 228 comprising a deasserted write-update-requested attribute 234, 236 may perform a write invalidate operation responsive to the response message 240 comprising the asserted write-update-valid attribute 242 (block 618).

FIG. 7 is a block diagram of an exemplary processor-based device 700, such as the processor-based device 100 of FIG. 1, that provides dynamic selection of cache coherence protocols. The processor-based device 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 700 includes a processor 702. The processor 702 represents one or more general-purpose processing circuits, such as a microprocessor, central processing unit, or the like, and may correspond to the PEs 102(0)-102(P) of FIG. 1. The processor 702 is configured to execute processing logic in instructions for performing the operations and steps discussed herein. In this example, the processor 702 includes an instruction cache 704 for temporary, fast access memory storage of instructions and an instruction processing circuit 710. Fetched or prefetched instructions from a memory, such as from a system memory 708 over a system bus 706, are stored in the instruction cache 704. The instruction processing circuit 710 is configured to process instructions fetched into the instruction cache 704 and process the instructions for execution.

The processor 702 and the system memory 708 are coupled to the system bus 706 and can intercouple peripheral devices included in the processor-based device 700. As is well known, the processor 702 communicates with these other devices by exchanging address, control, and data information over the system bus 706. For example, the processor 702 can communicate bus transaction requests to a memory controller 712 in the system memory 708 as an example of a peripheral device. Although not illustrated in FIG. 7, multiple system buses 706 could be provided, wherein each system bus constitutes a different fabric. In this example, the memory controller 712 is configured to provide memory access requests to a memory array 714 in the system memory 708. The memory array 714 is comprised of an array of storage bit cells for storing data. The system memory 708 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 706. As illustrated in FIG. 7, these devices can include the system memory 708, one or more input device(s) 716, one or more output device(s) 718, a modem 724, and one or more display controller(s) 720, as examples. The input device(s) 716 can include any type of input device, including, but not limited to, input keys, switches, voice processors, etc. The output device(s) 718 can include any type of output device, including, but not limited to, audio, video, other visual indicators, etc. The modem 724 can be any device configured to allow exchange of data to and from a network 726. The network 726 can be any type of network, including, but not limited to, a wired or wireless network, a private or public network, a local area network (LAN), a wireless local area network (WLAN), a wide area network (WAN), a BLUETOOTH™ network, and the Internet. The modem 724 can be configured to support any type of communications protocol desired. The processor 702 may also be configured to access the display controller(s) 720 over the system bus 706 to control information sent to one or more display(s) 722. The display(s) 722 can include any type of display, including, but not limited to, a cathode ray tube (CRT), a liquid crystal display (LCD), a plasma display, etc.

The processor-based device 700 in FIG. 7 may include a set of instructions 728 to be executed by the processor 702 for any application desired according to the instructions. The instructions 728 may be stored in the system memory 708, processor 702, and/or instruction cache 704 as examples of non-transitory computer-readable medium 730. The instructions 728 may also reside, completely or at least partially, within the system memory 708 and/or within the processor 702 during their execution. The instructions 728 may further be transmitted or received over the network 726 via the modem 724, such that the network 726 includes the computer-readable medium 730.

While the computer-readable medium 730 is shown in an exemplary embodiment to be a single medium, the term "computer-readable medium" should be taken to include a single medium or multiple media (e.g., a centralized or distributed database, and/or associated caches and servers) that store the one or more sets of instructions 728. The term "computer-readable medium" shah also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Crate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
a plurality of processing elements (PE) comprising a master PE and at least one snooper PE; and
a central ordering point (COP);
the master PE configured to send a cache coherence bus command to the COP as part of a memory store operation; and
the COP configured to:
responsive to receiving the cache coherence bus command sent by the master PE, dynamically select, on a store-by-store basis, one of a write invalidate protocol and a write update protocol as a cache coherence protocol to use for maintaining cache coherency, based on one or more protocol preference indicators provided by one or more of the master PE, the at least one snooper PE, and the COP; and
send a response message to each of the master PE and the at least one snooper PE indicating the selected cache coherence protocol.

2. The processor-based device of claim 1, wherein the cache coherence bus command comprises one of:
a non-allocating-write bus command sent responsive to a cache miss on a cache of the master PE, wherein the memory store operation is not write-allocating in the cache of the master PE;
a read-with-intent-to-write bus command sent responsive to a cache miss on the cache of the master PE, wherein the memory store operation is write-allocating in the cache of the master PE; and
a promote-to-writeable bus command sent responsive to a cache hit on a cache line in the cache of the master PE, wherein the cache line is held in a shared coherence state.

3. The processor-based device of claim 1, wherein:
the one or more protocol preference indicators comprises a prevent-write-update attribute of the cache coherence bus command by the master PE; and
the master PE is further configured to:
predict whether the write invalidate protocol is preferred;
responsive to predicting that the write invalidate protocol is preferred, assert the prevent-write-update attribute of the cache coherence bus command; and
responsive to predicting that the write invalidate protocol is not preferred, deassert the prevent-write-update attribute of the cache coherence bus command.

4. The processor-based device of claim 3, wherein the master PE is configured to predict whether the write invalidate protocol is preferred by being configured to predict whether the memory store operation is one of a plurality of memory store operations to a same coherence granule.

5. The processor-based device of claim 4, wherein the master PE is configured to predict whether the write invalidate protocol is preferred by being further configured to predict whether the memory store operation does not comprise an atomic read-modify-write operation.

6. The processor-based device of claim 3, wherein the master PE is configured to predict whether the write invalidate protocol is preferred based on a software-provided hint.

7. The processor-based device of claim 3, wherein the COP is configured to send the response message to each of the master PE and the at least one snooper PE indicating the selected cache coherence protocol by being configured to, responsive to receiving the cache coherence bus command with the prevent-write-update attribute of the cache coherence bus command asserted, send the response message to each of the master PE and the at least one snooper PE comprising a deasserted write-update-valid attribute indicating that the write invalidate protocol is selected for the memory store operation.

8. The processor-based device of claim 1, wherein:
the one or more protocol preference indicators comprises a write-update-requested attribute of a snoop command that is associated with the cache coherence bus command sent by the master PE and that is sent by the COP to the at least one snooper PE; and
the COP is further configured to:
predict whether the write update protocol is preferred;
responsive to predicting that the write update protocol is preferred, assert the write-update-requested attribute of the snoop command; and
responsive to predicting that the write update protocol is not preferred, deassert the write-update-requested attribute of the snoop command.

9. The processor-based device of claim 8, wherein the COP is configured to predict whether the write update protocol is preferred by being configured to determine whether a count of the master PE and the at least one snooper PE holding a local cached copy of a coherence granule to be written by the memory store operation exceeds an agent threshold.

10. The processor-based device of claim 1, wherein:
the one or more protocol preference indicators comprises a write-update-requested attribute of a snoop reply that is associated with a snoop command sent by the COP and that is sent to the COP by a snooper PE of the at least one snooper PE; and
the snooper PE is configured to:
predict whether the write update protocol is preferred;
responsive to predicting that the write update protocol is preferred, assert the write-update-requested attribute of the snoop reply; and
responsive to predicting that the write update protocol is not preferred, deassert the write-update-requested attribute of the snoop reply.

11. The processor-based device of claim 10, wherein the snooper PE is configured to predict whether the write update protocol is preferred by being configured to:
determine whether a write-update-preferred attribute of the snoop command sent by the COP is asserted; and
responsive to determining that the write-update-preferred attribute of the snoop command sent by the COP is asserted, predict that the write update protocol is preferred unless the snooper PE is unwilling to receive write update data.

12. The processor-based device of claim 10, wherein the snooper PE is configured to predict whether the write update protocol is preferred by being configured to predict whether the snooper PE is likely to reread a coherence granule to be written by the memory store operation.

13. The processor-based device of claim 12, wherein the snooper PE is configured to predict whether the snooper PE is likely to reread the coherence granule to be written by the memory store operation based on a position of a local cached copy of the coherence granule in a local cache of the snooper PE as determined by a cache replacement policy of the local cache.

14. The processor-based device of claim 12, wherein the snooper PE is configured to predict whether the snooper PE is likely to reread the coherence granule to be written by the memory store operation by being configured to determine whether a local cached copy of the coherence granule is held in the exclusive state at the time the snooper PE receives the snoop command.

15. The processor-based device of claim 12, wherein the snooper PE is configured to predict whether the snooper PE is likely to reread the coherence granule to be written by the memory store operation by being configured to determine whether a local cached copy of the coherence granule is held in the modified or owned state but the snooper PE has not written to the coherence granule.

16. The processor-based device of claim 1, wherein:
the COP is further configured to:
receive at least one snoop reply corresponding to the at least one snooper PE; and
determine whether any snoop reply of the at least one snoop reply comprises an asserted write-update-request attribute; and
the COP is configured to send the response message to each of the master PE and the at least one snooper PE indicating the selected cache coherence protocol by being configured to:
responsive to determining that any snoop reply of the at least one snoop reply comprises an asserted write-update-request attribute, send the response message to each of the master PE and the at least one snooper PE comprising an asserted write-update-valid attribute indicating that the write update protocol is selected for the memory store operation; and
responsive to determining that no snoop reply of the at least one snoop reply comprises an asserted write-update-request attribute, send the response message to each of the master PE and the at least one snooper PE comprising a deasserted write-update-valid attribute indicating that the write invalidate protocol is selected for the memory store operation.

17. The processor-based device of claim 16, wherein:
each snooper PE of the at least one snooper PE corresponding to a snoop reply of the at least one snoop reply comprising an asserted write-update-request attribute is configured to perform a write update operation responsive to the response message comprising an asserted write-update-valid attribute; and
each snooper PE of the at least one snooper PE corresponding to a snoop reply of the at least one snoop reply comprising a deasserted write-update-request attribute is configured to perform a write invalidate operation responsive to the response message comprising an asserted write-update-valid attribute.

18. A method for dynamically selecting cache coherence protocols in processor-based devices, comprising:

sending, by a master processing element (PE) of a plurality of PEs of a processor-based device, a cache coherence bus command to a central ordering point (COP) of the processor-based device as part of a memory store operation;

responsive to receiving the cache coherence bus command, dynamically selecting, by the COP on a store-by-store basis, one of a write invalidate protocol and a write update protocol as a cache coherence protocol to use for maintaining cache coherency, based on one or more protocol preference indicators provided by one or more of the master PE, at least one snooper PE of the plurality of PEs, and the COP; and sending, by the COP, a response message to each of the master PE and the at least one snooper PE indicating the selected cache coherence protocol.

19. The method of claim 18, wherein the cache coherence bus command comprises one of:

a non-allocating-write bus command sent responsive to a cache miss on a cache of the master PE, wherein the memory store operation is not write-allocating in the cache of the master PE;

a read-with-intent-to-write bus command sent responsive to a cache miss on the cache of the master PE, wherein the memory store operation is write-allocating in the cache of the master PE; and a promote-to-writeable bus command sent responsive to a cache hit on a cache line in the cache of the master PE, wherein the cache line is held in a shared coherence state.

20. The method of claim 18, wherein:

the one or more protocol preference indicators comprises a prevent-write-update attribute of the cache coherence bus command by the master PE; and the method further comprises:
predicting, by the master PE, that the write invalidate protocol is preferred; and
responsive to predicting that the write invalidate protocol is preferred, asserting, by the master PE, the prevent-write-update attribute of the cache coherence bus command.

21. The method of claim 20, wherein predicting that the write invalidate protocol is preferred comprises predicting, by the master PE, that the memory store operation is one of a plurality of memory store operations to a same coherence granule.

22. The method of claim 21, wherein predicting that the write invalidate protocol is preferred further comprises predicting, by the master PE, that the memory store operation does not comprise an atomic read-modify-write operation.

23. The method of claim 20, wherein predicting that the write invalidate protocol is preferred is based on a software-provided hint.

24. The method of claim 20, wherein sending, by the COP, the response message to each of the master PE and the at least one snooper PE indicating the selected cache coherence protocol comprises, responsive to receiving the cache coherence bus command with the prevent-write-update attribute of the cache coherence bus command asserted, sending, by the COP, the response message to each of the master PE and the at least one snooper PE comprising a deasserted write-update-valid attribute indicating that the write invalidate protocol is selected for the memory store operation.

25. The method of claim 18, wherein:

the one or more protocol preference indicators comprises a write-update-requested attribute of a snoop command that is associated with the cache coherence bus command sent by the master PE and that is sent by the COP to the at least one snooper PE; and the method further comprises:
predicting, by the COP, that the write update protocol is preferred; and
responsive to predicting that the write update protocol is preferred, asserting, by the COP, the write-update-requested attribute of the snoop command.

26. The method of claim 25, wherein predicting that the write update protocol is preferred comprises determining that a count of the master PE and the at least one snooper PE holding a local cached copy of a coherence granule to be written by the memory store operation exceeds an agent threshold.

27. The method of claim 18, wherein:

the one or more protocol preference indicators comprises a write-update-requested attribute of a snoop reply that is associated with a snoop command sent by the COP and that is sent to the COP by a snooper PE of the at least one snooper PE; and the method further comprises:
predicting, by the snooper PE, that the write update protocol is preferred; and
responsive to predicting that the write update protocol is preferred, asserting, by the snooper PE, the write-update-requested attribute of the snoop reply.

28. The method of claim 27, wherein predicting that the write update protocol is preferred comprises:

determining that a write-update-preferred attribute of the snoop command sent by the COP is asserted; and
responsive to determining that the write-update-preferred attribute of the snoop command sent by the COP is asserted, predicting that the write update protocol is preferred unless the snooper PE is unwilling to receive write update data.

29. The method of claim 27, wherein predicting that the write update protocol is preferred comprises predicting that the snooper PE is likely to reread a coherence granule to be written by the memory store operation.

30. The method of claim 29, wherein predicting that the snooper PE is likely to reread the coherence granule to be written by the memory store operation is based on a position of a local cached copy of the coherence granule in a local cache of the snooper PE as determined by a cache replacement policy of the local cache.

31. The method of claim 29, wherein predicting that the snooper PE is likely to reread the coherence granule to be written by the memory store operation comprises determining whether a local cached copy of the coherence granule is held in the exclusive state at the time the snooper PE receives the snoop command.

32. The method of claim 29, wherein predicting that the snooper PE is likely to reread the coherence granule to be written by the memory store operation comprises determining whether a local cached copy of the coherence granule is held in the modified or owned state but the snooper PE has not written to the coherence granule.

33. The method of claim 18, further comprising:

receiving, by the COP, at least one snoop reply corresponding to the at least one snooper PE; and
determining, by the COP, that any snoop reply of the at least one snoop reply comprises an asserted write-update-request attribute;
wherein sending, by the COP, the response message to each of the master PE and the at least one snooper PE indicating the selected cache coherence protocol comprises, responsive to determining that any snoop reply of the at least one snoop reply comprises an asserted write-update-request attribute, sending, by the COP, the response message to each of the master PE and the at least one snooper PE comprising an asserted write-update-valid attribute indicating that the write update protocol is selected for the memory store operation.

34. The method of claim 33, further comprising:
performing, by each snooper PE of the at least one snooper PE corresponding to a snoop reply of the at least one snoop reply comprising an asserted write-update-request attribute, a write update operation responsive to the response message comprising an asserted write-update-valid attribute; and
performing, by each snooper PE of the at least one snooper PE corresponding to a snoop reply of the at least one snoop reply comprising a deasserted write-update-request attribute, a write invalidate operation responsive to the response message comprising an asserted write-update-valid attribute.

35. The method of claim 29, further comprising:
receiving, by the COP, at least one snoop reply corresponding to the at least one snooper PE; and
determining, by the COP, that no snoop reply of the at least one snoop reply comprises an asserted write-update-request attribute;
wherein sending, by the COP, the response message to each of the master PE and the at least one snooper PE indicating the selected cache coherence protocol comprises, responsive to determining that no snoop reply of the at least one snoop reply comprises an asserted write-update-request attribute, sending, by the COP, the response message to each of the master PE and the at least one snooper PE comprising a deasserted write-update-valid attribute indicating that the write invalidate protocol is selected for the memory store operation.

36. A non-transitory computer-readable medium having stored thereon computer-executable instructions which, when executed by a processor, cause the processor to:
send, by a master processing element (PE) of a plurality of PEs of the processor, a cache coherence bus command to a central ordering point (COP) of the processor as part of a memory store operation;
responsive to receiving the cache coherence bus command, dynamically select, by the COP on a store-by-store basis, one of a write invalidate protocol and a write update protocol as a cache coherence protocol to use for maintaining cache coherency, based on one or more protocol preference indicators provided by one or more of the master PE, at least one snooper PE of the plurality of PEs, and the COP; and
send, by the COP, a response message to each of the master PE and the at least one snooper PE indicating the selected cache coherence protocol.

* * * * *